United States Patent [19]
Nohira

[11] 3,888,080
[45] June 10, 1975

[54] AIR FLOW CONTROL VALVE
[75] Inventor: Hidetaka Nohira, Susono, Japan
[73] Assignee: Toyota Jidosha Kogyo Kabushiki Kaisha, Toyota, Japan
[22] Filed: June 17, 1974
[21] Appl. No.: 480,252

[30] Foreign Application Priority Data
June 20, 1973 Japan .................. 48-68691

[52] U.S. Cl. ............................ 60/290
[51] Int. Cl. ........................... F02b 75/10
[58] Field of Search ................ 60/289, 290

[56] References Cited
UNITED STATES PATENTS

| | | | |
|---|---|---|---|
| 3,733,829 | 5/1973 | Henault | 60/289 |
| 3,805,522 | 4/1974 | Sheppard | 60/290 |
| 3,826,089 | 7/1974 | Nakajima | 60/290 |
| 3,849,984 | 11/1974 | Toda | 60/290 |

*Primary Examiner*—Douglas Hart
*Attorney, Agent, or Firm*—Stevens, Davis, Miller & Mosher

[57] ABSTRACT

In an internal combustion engine exhaust system, an air pump is provided as a source of secondary air. The air pump is connected to the input port of a first changeover valve having first and second output ports selectively connected to an exhaust duct upstream of a catalytic converter or to the inlet of a second changeover valve. First and second output ports of the second changeover valve are selectively connected to either the exhaust port of the engine or the atmosphere. The first and second changeover valves are switched by control means responsive to engine intake port vacuum pressure or catalytic converter temperature, whereby secondary air control is provided in response to varying engine operation conditions.

2 Claims, 5 Drawing Figures

AIR FLOW CONTROL VALVE

BACKGROUND OF THE INVENTION

This invention relates to internal combustion engine exhaust systems, and more particularly to a system in which secondary air is introduced in response to driving conditions.

DESCRIPTION OF THE PRIOR ART

Providing secondary air in an internal combustion engine exhaust system is a technique of providing atmospheric air into the exhaust system for the purpose of reducing pollution due to engine exhaust. In conjunction with pollution control, a catalytic converter for treating exhaust gases has come into increasingly widespread use. It is necessary to provide improved control of the introduction of secondary air for improved operation die to changes in operating conditions of an engine which affect the temperature of the catalytic converter. A typical catalytic converter improves exhaust characteristics by causing additional oxidation of exhaust fumes. Therefore, depending on engine conditions, the catalytic converter may have a tendency to overheat. Overheating of a catalytic converter deteriorates its purifying ability. One example of engine operation in which this may occur is in the ascending of a steep hill or running at high speed. Under such conditions, the engine throttle valve is opened widely, and the unburned component of exhaust gases to be treated in the exhaust system increases enormously. At the same time, the catalyst is raised in temperature due to its own reaction heat. Also, when a vehicle descends a long steep slope without stopping, the engine throttle valve is opened much less widely, and the fuel-air mixture supplied to the combustion chamber is so lean that not all gases in the combustion chamber are sufficiently burned. The discharge gases from the combustion chamber pass through the catalytic converter, in which a catalyst completes oxidation of the unburned gases. Due to the large amount of unburned gas to be oxidized, the catalyst may be overheated. Not only is the deterioration of the catalyst accelerated, but the catalytic converter temperature may rise to such a degree as to be dangerous in terms of vehicle safety.

In some prior art systems, in order to avoid such catalyst deterioration, devices are designed to cut off the supply of air. However, such systems may lack flexibility in appropriate response of secondary air supply to driving conditions.

SUMMARY OF THE INVENTION

It is therefore an object of the present invention to provide an internal combustion engine exhaust system including means for controlling the supply of secondary air in response to engine operating conditions.

It is also an object of the present invention to provide a system of the type described in which deterioration of a catalyst in a catalytic converter which treats exhaust fumes due to temperature is reduced.

It is a more specific object of the present invention to provide a system of the type described in which the flow of secondary air is responsive to catalytic converter temperature.

It is another specific object of the present invention to provide a system of the type described in which secondary airflow is responsive to vacuum pressure at the internal combustion engine intake port.

It is yet another object of the present invention to provide a system of the type described in which unburned components of engine exhaust are oxidized in a catalytic converter while overheating of the catalytic converter is prevented.

Briefly stated, and in accordance with the present invention, there is provided an engine exhaust system in which two changeover valves are utilized to direct air supplied from a pump providing secondary air. The output of the first changeover valve supplies air from the pump to an input of a catalytic converter or to an input of the second changeover valve. The outputs of the second changeover valve are connected to either the engine exhaust port or the atmosphere. Switching of the changeover valves is performed responsive to engine intake port vacuum pressure or in response to catalytic converter temperature.

BRIEF DESCRIPTION OF THE DRAWINGS

The means by which the foregoing objects and features of novelty are achieved are pointed out with particularity in the claims forming the concluding portion of the specification. The invention, both as to its organization and manner of operation, may be further understood by reference to the following description taken in connection with the following drawings.

Of the drawings.

DESCRIPTION OF THE PREFERRED EMBODIMENT

Figure 1:
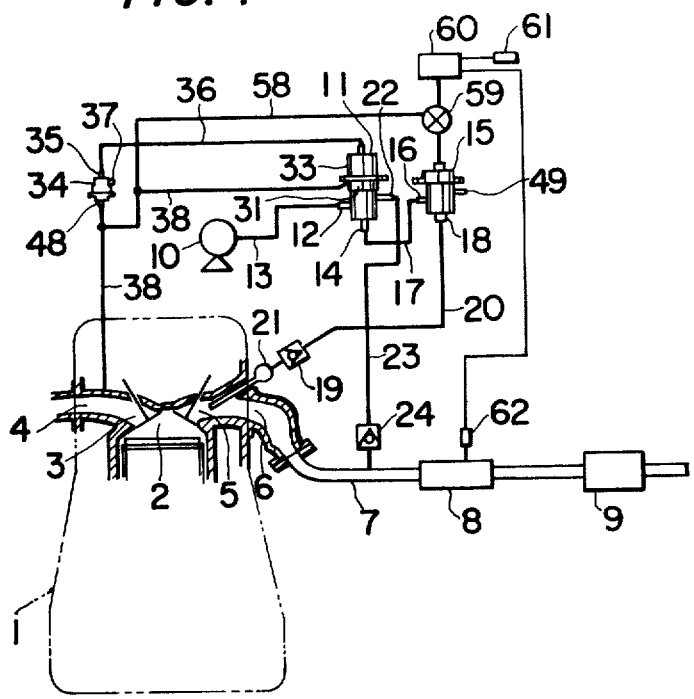
FIG. 1 is a diagram partly in schematic form and partly in cross section form of an exhaust system constructed in accordance with the present invention for treating the exhaust of an internal combustion engine.

Referring now to FIG. 1, there is illustrated a system constructed in accordance with the present invention in which an internal combustion engine 1 is connected to a secondary air control and exhaust system. The engine 1 has a combustion chamber 2 which receives fuel and air from an intake pipe 4 through an intake port 3. The combustion chamber 2 may comprise one or more (e.g. 4, 6 or 8) well-known cylinders. Exhaust gases from the combustion chamber 2 exit via an exhaust port 5 to an exhaust manifold 6 of the engine 1. Opening and closing of the intake port 3 and exhaust port 5 is controlled by standard valves in a well-known manner. The exhaust manifold 6 is connected to an exhaust pipe 7 having connected thereto a catalytic converter 8 and silencer (or muffler) 9 for discharging exhaust gas to the atmosphere. The catalytic converter 8 and silencer 9 are wellknown in the art and are provided respectively for oxidizing exhaust gases and muffling engine sounds.

A source of secondary air is provided in the form of an air pump 10, hereinafter referred to as the pump 10, which provides air via a duct 13 to a two-position changeover valve 11 at an input, or suction, port 12. The valve 11 has a first exhaust port 14 coupled to a second two-position changeover valve 15 at a suction port 16 by a duct 17. The valve 15 has a first exhaust port 18 connected by a duct 20 through a check valve 19 to a nozzle 21 extending to a position adjacent the exhaust port 5 of the combustion chamber 2. The check valve 19 permits flow in only one direction, namely from the exhaust port 18 to the nozzle 21. The first two-position changeover valve 11 has a second exhaust port 22 connected by a duct 23 and check valve 24 to the exhaust pipe 7, upstream of the catalytic converter 8 and downstream of the exhaust manifold 6. The check valve 24 permits airflow in only one direction, namely from the second exhaust port 22 to the exhaust pipe 7.

Figure 2:
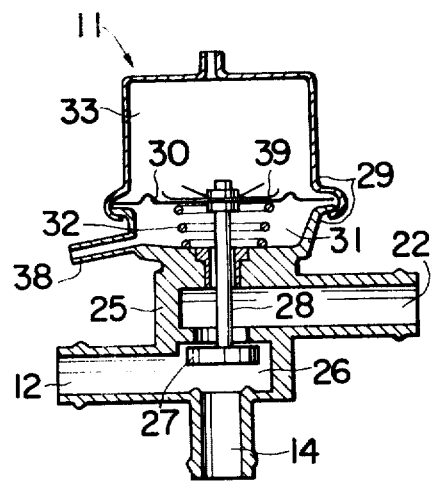
FIGS. 2 and 3 are vertical cross sectional views of two-position changeover valves used for controlling the flow of secondary air.

Referring now to FIG. 2, the first two-position changeover valve 11 is illustrated in greater detail. The valve 11 comprises a housing 25 having a valve chest 26 formed therein which communicates with the suction port 12, first exhaust port 14, and second exhaust port 22. A valve stem 28 passing through suitable sealing means in the housing 25 is connected to a valve member 27 positioned in the valve chest 26 at one end of the stem 28. The valve member 27 may be operated by the valve stem 28 so as to close an opening between the valve chest 26 and the second exhaust port 22, whereby the suction port 12 is connected to the first exhaust port 14, which is the first position of the valve 11. Alternatively, in the second position of the valve 11, the valve member 27 may close off the first exhaust port 14, whereby the suction port 12 is connected to the second exhaust port 22. The valve stem 28 is operated by pressure-responsive means comprising a diaphragm 30 attached to the valve stem 28 opposite the valve member 27. The diaphragm 30 is provided in a casing 29 mounted on the housing 25 and having a chamber 31 on one side of the diaphragm 30 and a chamber 33 on the other side of the diaphragm 30. A spring 32 is provided inside the chamber 29 for pushing the diaphragm 30 away from the housing 25, and the valve member 27 closes the second exhaust port 22 in response to the force of the spring 32. The chamber 33 inside the casing 29 is connected to an operating valve 34 at a port 35 of the operating valve 34 by a duct 36. A second port of the operating valve 34 is connected to the atmosphere or a conventional engine air cleaner (not shown). When the chamber 33 of the first changeover valve 11 is under atmospheric pressure, the diaphragm 30 is displaced against the force of the spring 32, and the valve member 27 closes the second exhaust port 22. The chamber 31 of the two-position changeover valve 11 is connected to the intake manifold 4 of the engine 1 by a duct 38. When vacuum pressure from the intake manifold 4 is transmitted to the chamber 31, the diaphragm 30 is displaced instantaneously against the spring force of the spring 32, changing the valve 11 to a second position, and air flows through a small opening 39 in the diaphragm 30 to produce vacuum pressure in the chamber 33 equal to that in the chamber 31, returning the diaphragm 30 to its first position. In this manner, the valve 11 is momentarily switched to its second position.

Figure 4:
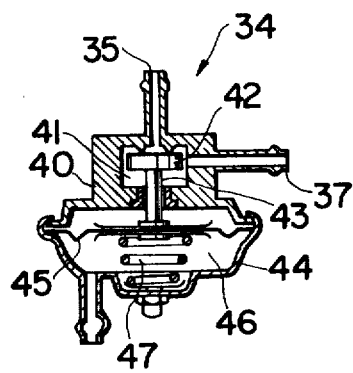
FIG. 4 is a vertical cross sectional view of another control valve used in the system of the present invention.

Referring now to FIG. 4, the operating valve 34 is illustrated in greater detail. The operating valve 34 comprises a housing 40 having a valve chest 41 formed therein communicating with the ports 35 and 37. A valve member 42 is provided therein at a first end of a valve stem 43 for opening or closing the port 35. The valve stem 43 extends through the housing 40 (through suitable sealing means), and a second end of the valve stem 43 is attached to a diaphragm 45 in a casing 44 mounted on the housing 40. A spring 47 is provided in in a chamber 46 defined by the diaphragm 45 and the casing 44 for pushing the diaphragm 45 and closing the port 35. In response to high vacuum pressure in the intake manifold 4, in the preferred embodiment approximately 550 mm Hg, the diaphragm 45 is displaced against the force of the spring 47 to open the port 35.

Figure 3:
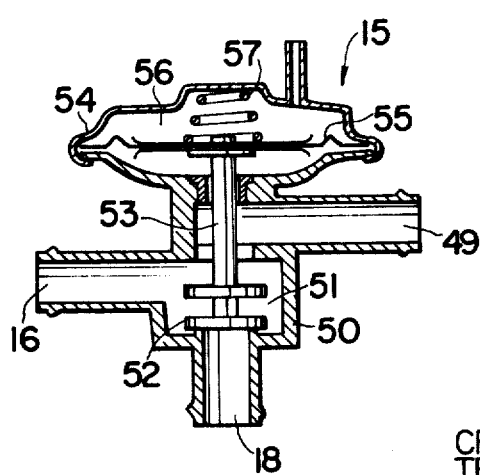

Referring to FIG. 3, the second two-position changeover valve 15 is illustrated in greater detail. A second exhaust port 49 is provided, connected to the atmosphere or to an air cleaner (not shown). The valve 15 comprises a housing 50 having a valve chest 51 formed therein and communicating with the suction port 16, the first exhaust port 18, and the second exhaust port 49. A valve member 52 is provided in the valve chest 51 on a valve stem 53 for selectively closing the first or second exhaust ports 18 or 49. The valve stem 53 extends through the housing 50, and the end opposite the valve member 52 is connected to pressure-responsive means preferably comprising a diaphragm 55 disposed inside a casing 54 formed on the housing 50. A chamber 56 defined by the casing 54 and diaphragm 55 is provided having a spring 57 positioned therein pushing against the diaphragm 55 for closing the first exhaust port 18, so that the valve 15 is in its first position. In the preferred embodiment, the spring force of the spring 57 is low so that the diaphragm 55 may be displaced by a vacuum pressure as low as, for example, 50 mm Hg in the chamber 56, in which case the valve member 52 closes the second exhaust port 49, and the valve 15 is in its second position.

An operating valve 59 is provided for selectively connecting the chamber 56 to a duct 58 and the duct 38 to the intake manifold 4 of the engine 1. In a preferred embodiment, the operating valve 59 may be a magnetic valve. The operating valve 59 is connected to a controller 60. The controller 60 is connected to a sensor 61 which may detect a predetermined high level of temperature or vehicle speed, and to a temperature sensor 62, which is positioned to sense temperature in the catalytic converter 8. Speed level is correlated to the degree of opening the throttle valve of the engine 1. The controller 60 closes the magnetic valve 59 in response to a predetermined temperature level or speed level, to keep the second two-position changeover valve 15 in its first position.

Operation

Operation is first described in the context of a warmed-up engine being driven under normal operating conditions. In this condition, the vacuum pressure in the intake manifold 4 is low, so that the negative pressure in the chamber 46 of the operating valve 44 is also low. Therefore, the port 35 of the operating valve 34 is closed, and the chamber 33 of the first two-position changeover valve is disconnected from the atmosphere. Therefore, even if a low vacuum pressure in the intake manifold 4 is introduced into the chamber 31 of the first two-position changeover valve 11, the second exhaust port 22 is closed, and the suction port 12 communicates with the first exhaust port 14. The vacuum pressure in the intake manifold 4 is also introduced into the chamber 56 of the second two-position changeover valve 15 through the magnetic valve 59 which is opened in response to engine heating, so that the suction port 16 communicates with the first exhaust port 18. Consequently, secondary air flows from the air pump 10 via the duct 13, valve 11, duct 17, and valve 15 to the duct 20 into the exhaust port 5 of the combustion chamber 2 in the engine 1. In this condition, unburned components in the exhaust gas are burned in the catalytic converter 8. In this condition, a comparatively rich fuel-air mixture is applied by well-known engine operation, and accordingly, the catalytic converter 8 gets heated. When the temperature of the catalytic converter reaches a predetermined level, the controller 60 closes the valve 59 in response to an input from the sensor 62. Consequently, the vacuum pressure of the intake manifold 4 is not introduced into the chamber 56 of the second two-position changeover valve 15, and the first exhaust port 18 is closed. The suction port 16 thus communicates with the discharge port 49. Consequently, secondary air flows from the air pump 10 through the first two-position changeover valve 11 to the input duct 16 of the second two-position changeover valve 15 and is discharged by the discharge port 49 into the atmosphere. In this manner, secondary air is not supplied to the exhaust port 5, and the catalytic converter 8 is prevented from overheating. Alternatively, rather than the above-identified operation being initiated in response to an input from the sensor 62, the same operation may be initiated responsive to the sensor 61 detecting the predetermined high level corresponding to an overheated engine conduction.

When the engine 1 is run under full-load, the vacuum pressure in the intake manifold 4 is reduced approximately to zero, so as not to operate the valve 15. Consequently, the suction port 16 communicates with the second exhaust port 49. At the same time, the first two-position changeover valve 11 connects the suction port 12 to the first exhaust port 14. Consequently, secondary air from the air pump 10 is coupled by the duct 13, valve 11, duct 17 and valve 15 to the atmosphere. In this operating condition, unburned exhaust components are burned in the catalytic converter 8. When the controller 60 is actuated in response to high temperature of at least a predetermined level, of the catalytic converter 8, the magnetic valve 59 is closed so that the two-position changeover valve 15 maintains its first position, thus supplying secondary air to the atmosphere in order to prevent the catalytic converter 8 from processing an excess amount of exhaust gas and from overheating excessively.

When speed is suddenly reduced, or the engine is racing, the vacuum pressure in the intake manifold 4 is raised. When such pressure is transmitted by the duct 38 to the chamber 31 of the valve 11, the diaphragm 30 is instantaneously displaced, so that the valve member 27 closes the first exhaust port 14. Consequently, the suction port 12 communicates with the second exhaust port 22. Secondary air from the pump 10 is thus supplied to the exhaust pipe 7 through the duct 23 from the exhaust port 16 of the valve 11. The secondary air cools exhaust gases exiting from the exhaust port 5 to prevent the possibility of explosion of unburned components in the exhaust pipe 7. After the first two-position changeover valve 11 is instantaneously switched, it returns to its first position again supplying secondary air from the air pump 10 to the exhaust port 5 in the normal above-described manner.

When a vehicle is descending a long slope, the vacuum pressure in the intake manifold 4 may be as high as 550 - 600 mm Hg, and the vacuum pressure operates the valve 34 so that the port 35 is connected to atmospheric pressure via the port 37. Consequently, the chamber 33 of the first two-position changeover valve 11 is at atmospheric pressure. The vacuum pressure in the intake manifold 4 is introduced into the chamber 31, whereby the discharge port 14 is closed, and the suction port 12 communicates with the discharge port 22. As a result, secondary air from the air pump 10 is supplied to the exhaust pipe 7. Consequently, it may be presumed that the unburned component in exhaust gas reacts with air in the catalytic converter and heats the catalytic converter 8 to a high temperature. In practice, however, the secondary air supplied to the exhaust pipe 7 cools the catalytic converter 8.

Figure 5:
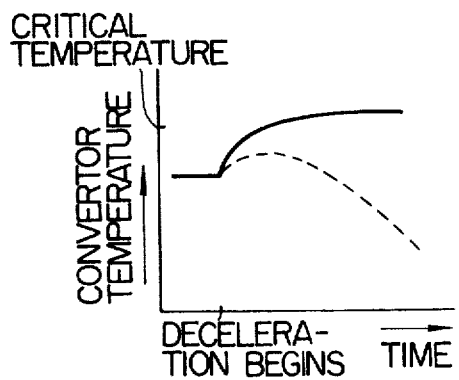
FIG. 5 is a plot of catalytic converter temperature versus time during engine deceleration for certain engine operating conditions.

Referring now to FIG. 5, in which the abscissa is time and the ordinate is temperature, the solid line represents a typical temperature range of the catalytic converter 8 in the absence of a supply of secondary air, and the dotted line represents a nominal temperature performance curve when secondary air is supplied as described above. As the reaction of the catalyst in the catalytic converter 8 occurs when the exhaust gas and secondary air are mixed together at a certain ratio, in the situation in which the secondary air is supplied to the exhaust duct 7 upstream of the catalytic converter 8 the mixing ratio is changed so that the reaction with the catalyst does not take place.

In accordance with the present invention, as described above, when unburned components exist in exhaust gas from the exhaust port 5 of the engine 1, the unburned gas and the secondary air is supplied to the exhaust port 5 of the engine 1 so that the unburned component reacts in the catalytic converter 8 with secondary air. When the catalytic converter is heated to a high temperature so that the unburned gas may not react in the catalytic converter 8, the supply of secondary air is interrupted, thus preventing the catalytic converter from deteriorating. When the vehicle speed is suddenly reduced, the supply of secondary air to the exhaust port 5 is interrupted, and the secondary air is supplied instantaneously to the exhaust pipe 7 in order to prevent explosion of unburned components in the exhaust pipe 7. Furthermore, when the car descends a long slope, the catalytic converter is heated to a high temperature as a result of the reaction of the unburned component in the catalytic converter 8, but the supply of the secondary air to a position upstream of the catalytic converter 8 cools the catalytic converter 8, whereby catalyst deterioration is prevented.

The above description has been written with a view toward enabling those skilled in the art to make many modifications and particular system details consistent with the above teachings to provide a system operating and constructed in accordance with the present invention.

What is claimed as new and desired to be secured by Letters Patent of the United States is:

1. In an internal combustion engine system in which the unburned component in discharge gas is burned in a catalytic converter mounted downstream of an exhaust pipe and the resulting gas is discharged to the atmosphere and including an engine having an intake manifold and having an exhaust manifold connected to the exhaust pipe, means for controlling the flow of secondary air comprising, in combination:

an air pump for supplying secondary air;

first and second two-position changeover valves, said first two-position changeover valve being connected to provide secondary air from said air pump to a suction port of said second changeover valve in a first position and to provide secondary air to the exhaust pipe upstream of the catalytic converter in a second position, and said second two-position changeover valve coupling said suction port to an exhaust port of a combustion chamber of the engine in a first position and coupling said suction port to the atmosphere in a second position;

first pressure responsive means responsively connected to the intake manifold of the engine connected for momentarily switching said first two-position changeover valve from its first position to its second position in response to a first level of vacuum pressure in the intake manifold;

a first operating valve responsively connected to said intake manifold and connected for introducing atmospheric pressure acting on said first pressure responsive means in response to a predetermined level of vacuum pressure in said intake manifold, whereby said first two-position changeover valve is maintained in its first position when the vacuum pressure in the intake manifold exceeds the predetermined level;

second pressure responsive means responsively coupled to the intake manifold connected for switching said second two-position changeover valve from its first position to its second position in response to a second level of vacuum pressure being lower than the first level;

a second operating valve connected between said second pressure responsive means and the intake manifold for selectively coupling said second pressure responsive means to the intake manifold; and a controller connected to operate said second operating valve, said controller including means for sensing catalytic converter temperature and closing said second operating valve in response to the temperature of the catalytic converter being above a predetermined level, whereby said second two-position changeover valve is maintained in its first position, whereby the flow of secondary air is controlled in response to engine operating conditions.

2. The combination according to claim 1 further comprising temperature responsive means connected to said controller for closing said operating valve in response to a predetermined high level of temperature of the engine corresponding to an overheated engine condition.

* * * * *